(12) United States Patent
Yang

(10) Patent No.: US 7,090,311 B2
(45) Date of Patent: Aug. 15, 2006

(54) BRAKE TRACTION CONTROL VALVE

(75) Inventor: I-Jin Yang, Pyungteak (KR)

(73) Assignee: Mando Corporation, Kyungki-do (KR)

( * ) Notice: Subject to any disclaimer, the term of this patent is extended or adjusted under 35 U.S.C. 154(b) by 0 days.

(21) Appl. No.: 10/732,619

(22) Filed: Dec. 9, 2003

(65) Prior Publication Data

US 2004/0135430 A1    Jul. 15, 2004

(30) Foreign Application Priority Data

Jan. 13, 2003 (KR) .................... 10-2003-0001946

(51) Int. Cl.
*B60T 8/36* (2006.01)
*F16K 31/02* (2006.01)

(52) U.S. Cl. .................. 303/119.2; 251/129.02

(58) Field of Classification Search ............ 303/119.1, 303/119.2, 119.3, 900, 901; 251/129.01–129.22, 251/357, 337, 333; 137/596.17
See application file for complete search history.

(56) References Cited

U.S. PATENT DOCUMENTS

| | | | |
|---|---|---|---|
| 3,818,927 A | 6/1974 | Zeuner | 137/110 |
| 5,167,442 A | 12/1992 | Alaze et al. | 303/113.2 |
| 5,203,617 A | 4/1993 | Wilde | 303/116.2 |
| 5,496,100 A | 3/1996 | Schmid | 303/119.2 |
| 5,673,980 A | 10/1997 | Schwarz et al. | 303/119.2 |
| 6,086,164 A | 7/2000 | Oehler et al. | 303/119.2 |
| 2004/0135429 A1 | 7/2004 | Yang | 303/119.2 |

FOREIGN PATENT DOCUMENTS

| | | |
|---|---|---|
| DE | 41 29 638 A1 | 3/1993 |
| DE | 196 07 933 A1 | 8/1997 |
| WO | 96/13413 | 5/1996 |

OTHER PUBLICATIONS

Abstract of KR Appln. No. 1019950030581, *Korean Patent Abstracts* (KR).

*Primary Examiner*—Xuan Lan Nguyen
(74) *Attorney, Agent, or Firm*—Ladas & Parry LLP

(57) ABSTRACT

A brake traction control valve is disclosed. The brake traction control valve includes a valve core, a shell, an armature, an exciting coil, a plunger, and a return spring. The valve core has an inlet to allow inside and outside of the valve core to communicate with each other, and a valve seat provided with an orifice therein. The shell having a dome plus cylinder shape is coupled to the valve core to cover one end of the valve core. The armature is placed in the shell to move forward and backward. The exciting coil is placed around the shell to cause the armature to move forward and backward. The plunger is placed in the valve core to move forward and backward to selectively open and dose the orifice while moving forward and backward by the armature. The return spring returns the plunger and the armature to open the orifice. The plunger includes a first body brought into contact with the armature, a second body connected to one end of the first body to move forward and backward so as to selectively open and close the orifice, and a relief spring provided between the first and second bodies so that the second body is pushed by oil pressure when the oil pressure increases above predetermined pressure.

8 Claims, 7 Drawing Sheets

PRIOR ART

BRAKE TRACTION CONTROL VALVE

CROSS-REFERENCE TO RELATED APPLICATION

This application claims the benefit of Korean Patent Application No. 2003-1946, filed Jan. 13, 2003 in the Korean Intellectual Property Office, the disclosure of which is incorporated herein by reference.

BACKGROUND OF THE INVENTION

1. Field of the Invention

The present invention relates, in general, to a brake traction control system capable of preventing a wheel slip on a road surface, and, more particularly, to a brake traction control valve having a relief function, which spontaneously opens a hydraulic line to prevent an excessive increase in pressure of brake oil pressurized by a hydraulic pump when traction control is performed.

2. Description of the Related Art

In general, brake traction control is a technology applied to an Anti-lock Brake System (ABS). A traction control system spontaneously detects a wheel slip and brakes an automobile even when a driver does not depress a brake pedal, thus preventing a further wheel slip.

A hydraulic circuit to which the brake traction control system is applied, as shown in FIG. 1, includes a Normal Open (NO) valve 3 placed on a hydraulic line connected from a master cylinder 1 to wheel cylinders 2, a Normal Close (NC) valve 4 placed on a return hydraulic line from the wheel cylinders 2, a hydraulic pump 5 designed to generate a braking pressure by re-pressuring brake oil returning from the wheel cylinders 2, a low-pressure accumulator 6 and a high-pressure accumulator 7 placed upstream and downstream of the hydraulic pump 5 to accumulate pressures of circulated brake oil, respectively, and an Electronic Control Unit (ECU; not shown).

The hydraulic circuit is also used to perform brake traction control, and further includes a first bypass hydraulic line 8a connecting a hydraulic line connected to an outlet side of the master cylinder 1 with a hydraulic line connected to an inlet side of the hydraulic pump 5, a reciprocating hydraulic valve 8 placed on the first bypass hydraulic line 8a to be normally opened and be dosed when a driver depresses a brake pedal 11, a traction control valve 9 placed on a hydraulic line connecting the outlet side of the master cylinder 1 with an outlet side of the high-pressure accumulator 7 to be normally opened, and a relief valve 10 placed on a second bypass hydraulic line 10a connecting the outlet side of the high-pressure accumulator 7 with the outlet side of the master cylinder 1.

In the conventional brake traction control system, when a wheel slip is detected during a start of an automobile, the hydraulic pump 5 is operated under the control of the ECU and, thus, a braking pressure is applied to the wheel cylinders 2. At this time, the traction control valve 9 and the NC valve 4 are kept dosed, so that brake oil located on the outlet side of the master cylinder 1 is drawn into the hydraulic pump 5 through the reciprocating hydraulic valve 8, and the hydraulic pump 5 implements braking of the automobile by pressurizing the drawn brake oil. In the above-described process, when braking pressure formed on the outlet side of the hydraulic pump 5 is excessively high, the relief valve 10 is opened and brake oil flows toward the master cylinder 1 through the second bypass hydraulic line 10a, thus maintaining appropriate braking pressure.

However, the conventional brake traction control system is disadvantageous in that it is complicated and voluminous because it must be provided with the second bypass hydraulic line 10a and the relief valve 10 to prevent an excessive increase in pressure on the outlet side of the hydraulic pump 5.

SUMMARY OF THE INVENTION

Accordingly, it is an object of the present invention to provide a brake traction control valve, which is spontaneously opened when pressure on an outlet side of a hydraulic pump excessively increases during brake traction control, thus maintaining appropriate braking pressure formed on the outlet side of the hydraulic pump without an additional bypass line and a relief valve.

Additional objects and/or advantages of the invention will be set forth in part in the description which follows and, in part, will be obvious from the description, or may be learned by practice of the invention.

The above and/or other objects are achieved by providing a brake traction control valve, including a valve core having an inlet to allow inside and outside of the valve core to communicate with each other, and a valve seat provided with an orifice therein; a shell having a dome plus cylinder shape, the shell being coupled to the valve core to cover one end of the valve core; an armature placed in the shell to move forward and backward; an exciting coil placed around the shell to cause the armature to move forward and backward; a plunger placed in the valve core to move forward and backward to selectively open and dose the orifice of the valve seat while moving forward and backward by an operation of the armature; and a return spring to return the plunger and the armature to open the orifice of the valve seat; wherein the plunger includes a first body provided to come in contact with the armature, a second body connected to one end of the first body to move forward and backward so as to selectively open and dose the orifice of the valve seat, and a relief spring provided between the first and second bodies so that the second body is pushed by oil pressure when the oil pressure increases above predetermined pressure, thereby opening the orifice.

The first body is provided with a stopper groove on an inside surface thereof, and the second body is provided with a stopper protrusion on an outside surface thereof, the stopper protrusion being constructed to slide within the stopper groove in a direction in which the second body moves forward and backward, and sliding a distance longer than that the second body moves forward or backward.

The second body is provided with a ball-shaped closing member at an end thereof opposite to the first body, the closing member selectively opening and closing the orifice of the valve seat.

The dosing member is integrated with the second body.

The relief spring has an elastic force greater than that of the return spring.

The relief spring is supported by a lower end of the first body at a first end thereof and by an outside surface of the second body at a second end thereof, and the second body is provided with a spring support on the outside surface thereof to support the second end of the relief spring.

BRIEF DESCRIPTION OF THE DRAWINGS

These and other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
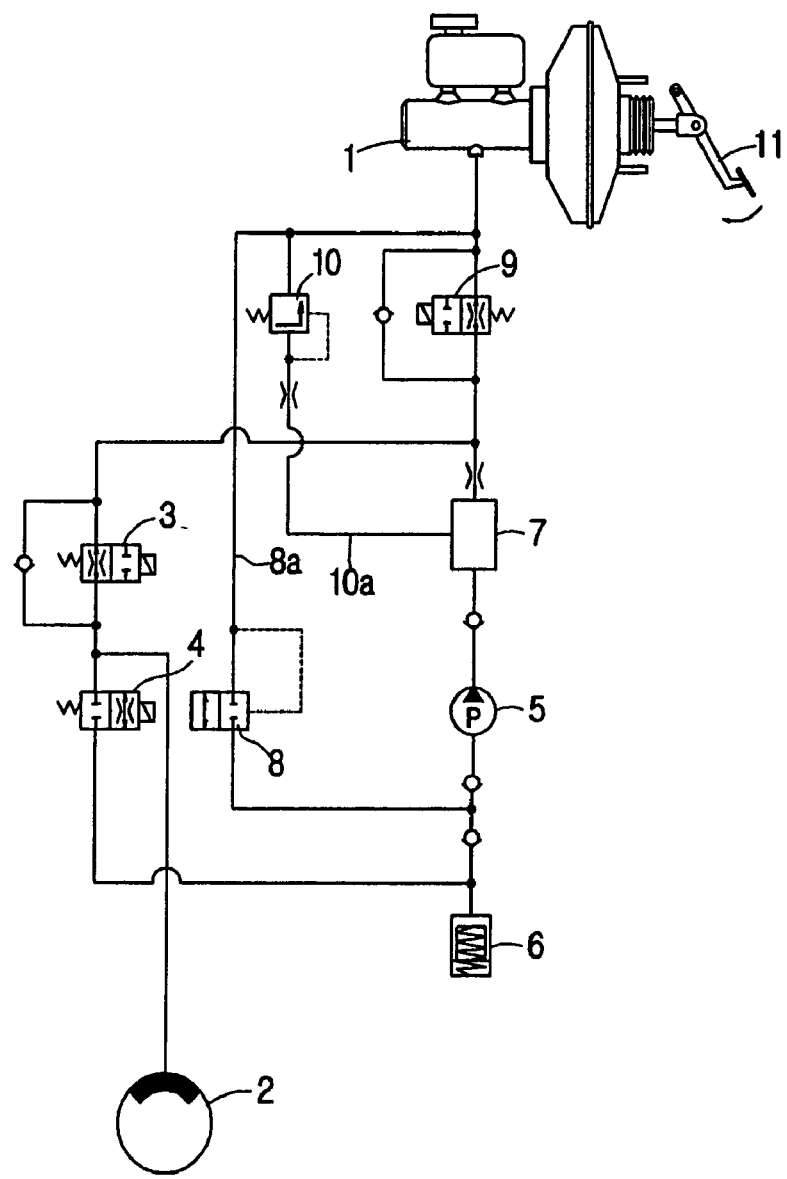
FIG. 1 is a hydraulic circuit diagram of an ABS to which a conventional brake traction control valve is applied.

Reference will now be made in detail to the present preferred embodiments of the present invention, examples of which are illustrated in the accompanying drawings, wherein like reference numerals refer to like elements throughout.

Figure 2:
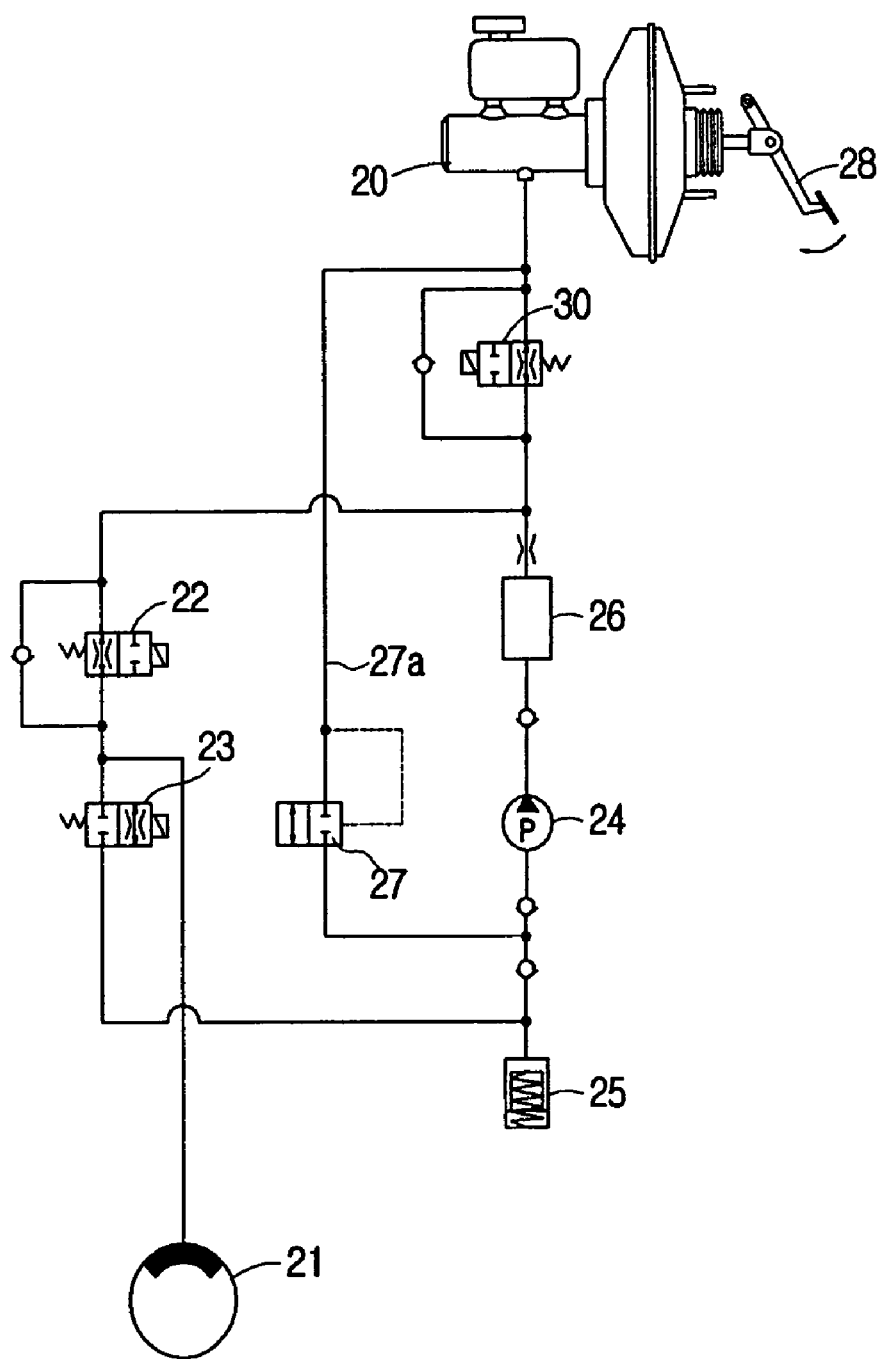
FIG. 2 is a hydraulic circuit diagram of an ABS to which a brake traction control valve according to the present invention is applied.

A hydraulic circuit of an ABS to which the present invention is applied, as shown in FIG. 2, includes an NO valve 22 placed on a hydraulic line connecting a master cylinder 20 with wheel cylinders 21 to selectively open and close the hydraulic line, and an NC valve 23 to selectively open and close a hydraulic line through which brake oil returns from the wheel cylinders 21. The NO value 22 is operated in conjunction with the NC valve 23. That is, when the NO valve 22 is opened, the NC valve 23 is closed, so that braking pressure can be applied to wheels of an automobile. In contrast, when the NO valve 22 is closed, the NC valve 23 is opened, so that braking pressure can be removed from the wheels.

The hydraulic circuit of the ABS further includes a hydraulic pump 24 to re-pressurize brake oil returned from the wheel cylinders 21 to a hydraulic line upstream of the NO valve 22, and a low-pressure accumulator 25 and a high-pressure accumulator 26 to be placed on hydraulic lines upstream and downstream of the hydraulic pump 24, respectively, to form a buffer space. The low-pressure accumulator 25 placed upstream of the hydraulic pump 24 temporarily stores brake oil returned from the wheel cylinders 21 and supplies the stored brake oil to the hydraulic pump 24, and the high-pressure accumulator 26 temporarily stores brake oil pressurized by the hydraulic pump 24 so that pressure pulsation caused by an operation of the hydraulic pump 24 is reduced.

The operations of the above-described elements are controlled by an ECU (not shown). In more detail, the ECU controls the NO and NC valves 22 and 23 to close a hydraulic line through which brake oil is supplied toward the wheels, and controls the hydraulic pump 24 to repressurize brake oil located near the low-pressure accumulator 25 toward the wheels, thus realizing intermittent braking.

The hydraulic circuit further includes a bypass hydraulic line 27a connecting a hydraulic line connected to an outlet side of the master cylinder 20 with a hydraulic line connected to an inlet side of the hydraulic pump 24, and a reciprocating hydraulic valve 27 placed on the bypass hydraulic line 27a to be normally opened and be closed when a driver depresses a brake pedal 11 and, thus, braking pressure is applied thereto. Accordingly, the reciprocating hydraulic valve 27 is operated so that braking pressure produced when the driver depresses the brake pedal 28 can be transmitted to the wheel cylinders 21.

A traction control valve 30 is placed on a hydraulic line connecting the outlet side of the master cylinder 20 with an outlet side of the high-pressure accumulator 26. The traction control valve 30 normally opens the hydraulic line, and closes the hydraulic line when a wheel slip occurs so that braking pressure, produced by an operation of the hydraulic pump 24, is transmitted to the wheels, thus spontaneously braking an automobile even when the driver does not depress the brake pedal 28.

Figure 3:
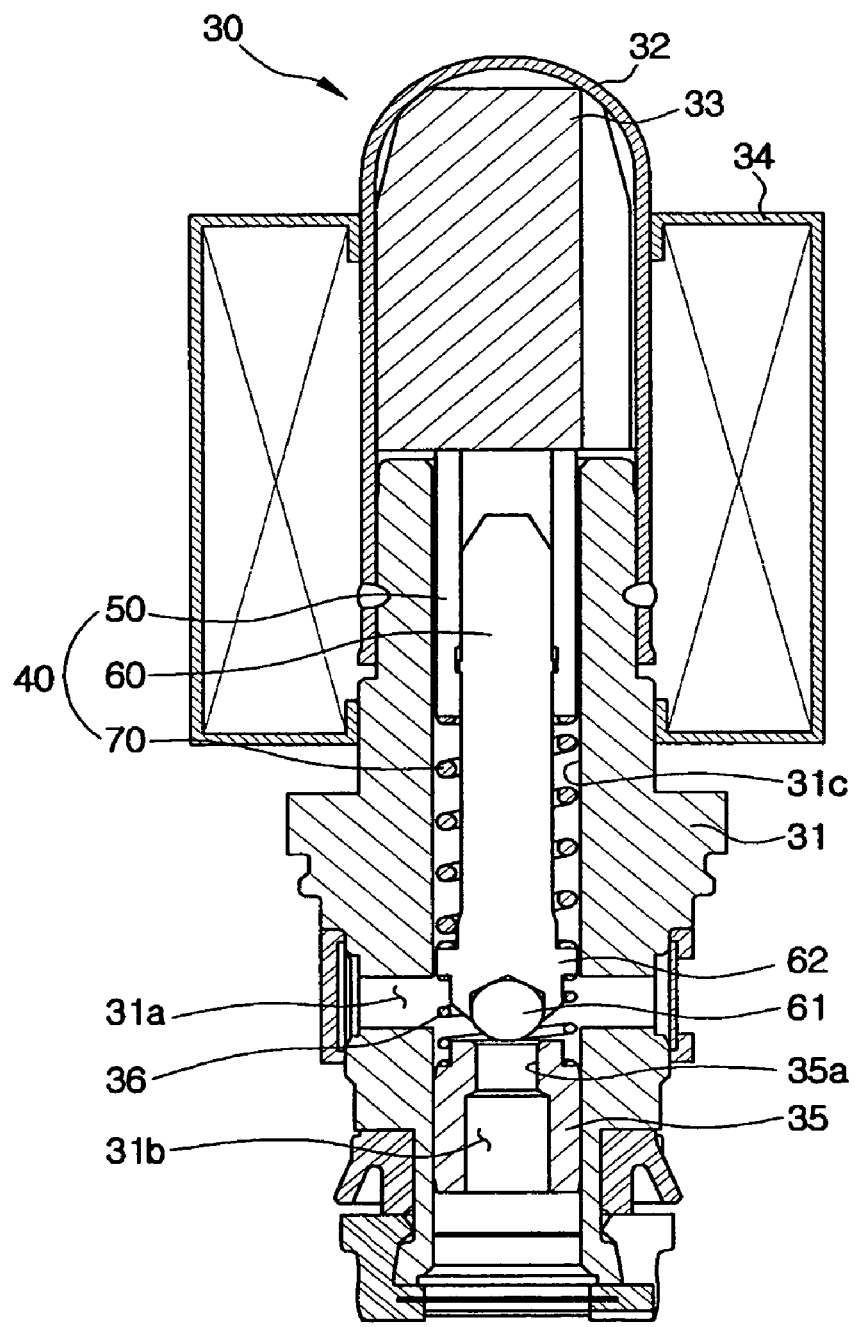
FIG. 3 is a sectional view showing a construction of the brake traction control valve of the present invention.
Figure 4:
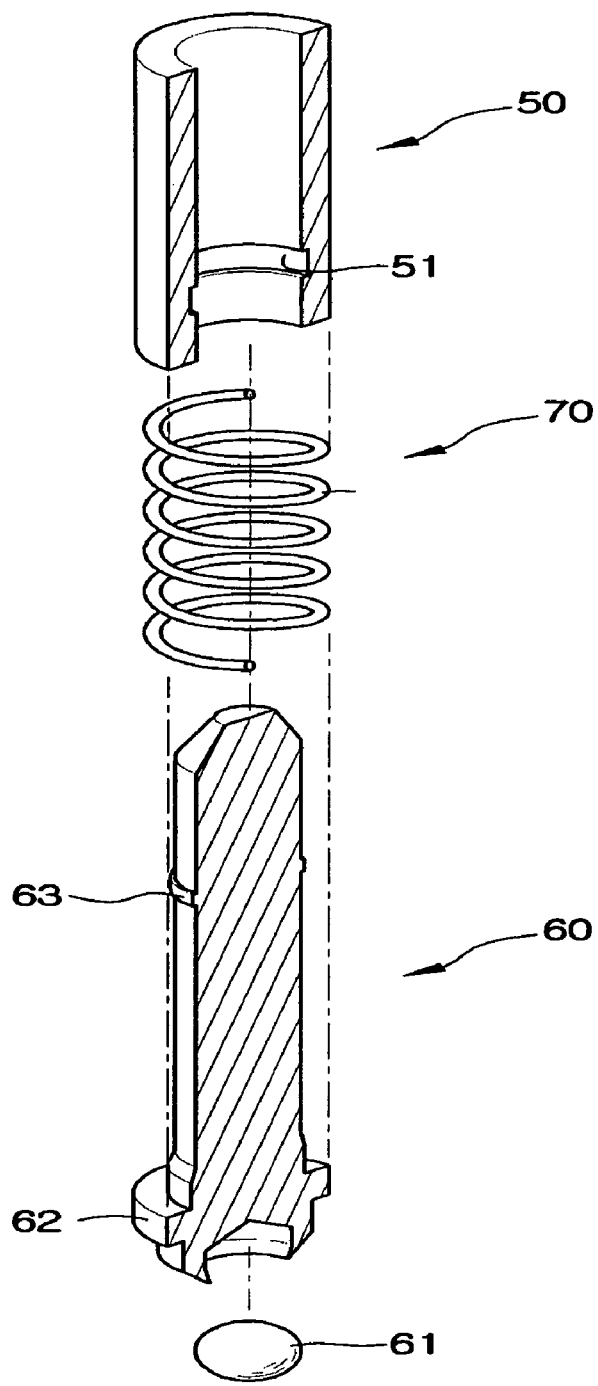
FIG. 4 is an exploded perspective view showing principal portions of the brake traction control valve of the present invention.

The traction control valve 30, as shown in FIGS. 3 and 4, includes a magnetic valve core 31 provided with an inlet 31a formed to allow an inside and outside thereof to communicate with each other and a hollow portion 31c longitudinally formed through a center portion thereof, a dome plus cylinder-shaped shell 32 coupled to the magnetic valve core 31 to cover an end of the magnetic valve core 31, and an armature 33 located in an inside of the shell 32 to selectively move forward and backward. The traction control valve 30 further includes a cylindrical exciting coil 34 located around the valve core 31 and the shell 32 to cause the armature 33 to selectively move forward and backward, a valve seat 35 tightly fitted into the inside of the valve core 31 and provided with an orifice 35a at a center thereof, a plunger 40 located in the inside of the valve core 31 to be operated so that it can selectively open and close the orifice 35a of the valve seat 35 while selectively moving forward and backward by the moving backward and forward of the armature 33, and a return spring 36 located between an end of the plunger 40 and the valve seat 35 to return the plunger 40 and the armature 33 so that the orifice 35a of the valve seat 35 is normally kept opened.

With the above-described structure, when power is not applied to the exciting coil 34, the plunger 40 is kept moved forward by the return spring 36 so that the orifice 35a of the valve seat 35 is opened. In contrast, when power is applied to the exciting coil 34, the plunger 40 together with the armature 33 moves backward and presses the return spring 36, so that the orifice 35a of the valve seat 35 is kept closed.

The plunger 40 provided to selectively open and close the orifice 35a of the valve seat 35 is adapted to perform a relief function of opening the orifice 35a when oil pressure formed on the orifice 35a increases above predetermined pressure in a state in which the orifice 35a is closed. For this purpose, the plunger 40 is constructed to include a first body 50 constituting an upper part of the plunger 40 to come in contact with the armature 33, a second body 60 constituting a lower part of the plunger 40 to be loosely fitted into an end of the first body 50 so that the orifice 35a of the valve seat 35 is selectively opened and closed, and a relief spring 70 provided between the first and second bodies 50 and 60 so that, when pressure formed on the orifice 35a is higher than the predetermined pressure, the second body 60 is pushed by the pressure and moved into the inside of the first body 50, thus opening the orifice 35a.

In more detail, the first body 50 is constructed to have a hollow cylindrical shape with an upper end thereof coming in contact with the armature 33. The second body 60 is constructed to have a rod shape so that it can move forward and backward with an upper end thereof inserted into an inside of the first body 50 through an open lower end of the first body 50. Into a lower end of the second body 60 is tightly fitted a ball-shaped closing member 61 that comes in direct contact with the orifice 35a of the valve seat 35 and selectively open and dose the orifice 35a. The closing member 61 may be constructed in such a way that the lower end of the second body 60 is formed to have a ball shape so that the dosing member 61 can be integrated with the second body into a single body.

The relief spring 70 provided between the first and second bodies 50 and 60 is supported at an upper end thereof by a lower end of the first body 50, and at a lower end thereof by a lower portion of an outside surface of the second body 60. To allow the lower end of the relief spring 70 to be supported by the lower portion of the outside surface of the second body 60, a spring support 62 is formed to be protruded from the outside surface of the second body 60 above the closing member 61. Accordingly, the lower end of the relief spring 70 can be supported by the spring support 62 by inserting the relief spring 70 into the second body 60 through the upper end of the second body 60 before inserting the upper end of the second body into the lower end of the first body 50.

A stopper groove 51 is radically formed on an inside surface of the lower end of the first body 50 and a stopper protrusion 63 corresponding to the stopper groove 51 is radically formed on the outside surface of the second body 60. With these constructions, when the upper end of the second body 60 is inserted into the lower end of the first body 50 with the stopper protrusion 63 of the second body 60 fitted into the stopper groove 51 of the first body 50 in a state in which the relief spring 70 is inserted over the second body 60, the first body 50 is combined with the second body 60 with the relief spring 70 placed between the first and second bodies 50 and 60. Accordingly, at the time of the assembly of the traction control valve 30, the plunger 40 is combined with the valve core 31 at one time with the first and second bodies 50 and 60 and the relief spring 70 assembled into a single body, so an assembly of the traction control valve 30 is easily performed notwithstanding that the traction control valve 30 is formed of various component parts.

A width of the stopper protrusion 63 is formed to be narrower than that of the stopper groove 51 so that the upper end of the second body 60 can move forward and backward within the lower end of the first body 50 in a state in which the first and second bodies 50 and 60 are combined with each other. With these constructions, when the upper end of the second body 60 moves forward and backward within the lower end of the first body 50 by an action of the relief spring 70, the stopper protrusion 63 slides forward and backward within the stopper groove 51. In this case, the stopper groove 51 and the stopper protrusion 63 must be formed to allow a sliding distance of the stopper protrusion 63 sliding within the stopper groove 51 to be longer than a moving distance of the second body 60 moving forward and backward within the first body 50 so that the movement of the second body 60 within the first body 50 may not be hindered by the stopper groove 51 and the stopper protrusion 63.

Meanwhile, the relief spring 70 must be constructed to have an elastic force greater than that of the return spring 36. The reason for this is to allow the relief spring 70 to function in such a way that the relief spring 70 is not pushed and functions as an intermediate member intermediating the first and second bodies 50 and 60 when pressure formed on the orifice 35a of the valve seat 35 is lower than the predetermined pressure, and the relief spring 70 is pushed by pressure of brake oil to cause the second body 60 to move into the inside of the first body 50 when the pressure formed on the orifice side of the valve seat 15 is higher than the predetermined pressure.

Next, operations of a brake traction control system to which the above-described traction control valve is applied are described.

When a driver depresses the brake pedal 28, braking pressure is produced in the master cylinder 20. The braking pressure is transmitted to the wheel cylinders 21 through the NO valve 22 and produces a braking force. If a wheel slip occurs due to transmission of excessive braking pressure, the wheel slip is detected by wheel sensors (not shown) placed at locations near the wheels, and information about the wheel slip is transmitted to the ECU. Then, the ECU opens the NC valve 23, so that brake oil flows out of the wheel cylinders 21, thus temporarily removing braking and, thus, preventing the wheel slip.

The brake oil flowing out of the NC valve 23 is temporarily stored in the low-pressure accumulator 25, the brake oil stored in the low-pressure accumulator 25 is re-pressurized by an operation of the hydraulic pump 24, the re-pressurized brake oil is discharged into the high-pressure accumulator 26, and the brake oil discharged into the high-pressure accumulator 26 is supplied to a hydraulic line upstream of the NO valve 22, thus forming braking pressure. The above-described operations are repeatedly performed under the control of the ECU, so that braking pressure is intermittently applied to the wheel cylinders 21, thereby performing a stable braking operation.

In the meantime, when a wheel slip is detected due to an abrupt start of the automobile or the like without regard to a manipulation of the brake pedal 28 of the driver, the traction control valve 30 and the NC valve 23 are dosed and the hydraulic pump 24 is operated under the control of the ECU, so that braking pressure formed by the operation of the hydraulic pump 24 is applied to the wheels through the NO valve 22, thus realizing braking of the automobile. At this time, brake oil is supplied from the outlet side of the master cylinder 20 through the reciprocating hydraulic valve 27 to the hydraulic pump 24, and the hydraulic pump 24 pressurizes the brake oil, thus realizing braking of the automobile.

When braking pressure formed on the outlet side of the hydraulic pump 24 and, thus, a braking force applied to the wheels is excessive during the above-described operations, a passage of the traction control valve 30 is spontaneously opened by the relief function of the traction control valve 30 and brake oil located on the outlet side of the hydraulic pump 24 flows toward the master cylinder 20, so that braking pressure applied to the wheels is appropriately maintained, thus preventing the wheels from being completely stopped and enabling smooth start of the automobile.

Detailed operations of the traction control valve 30, which performs the function, are described below.

Figure 5:
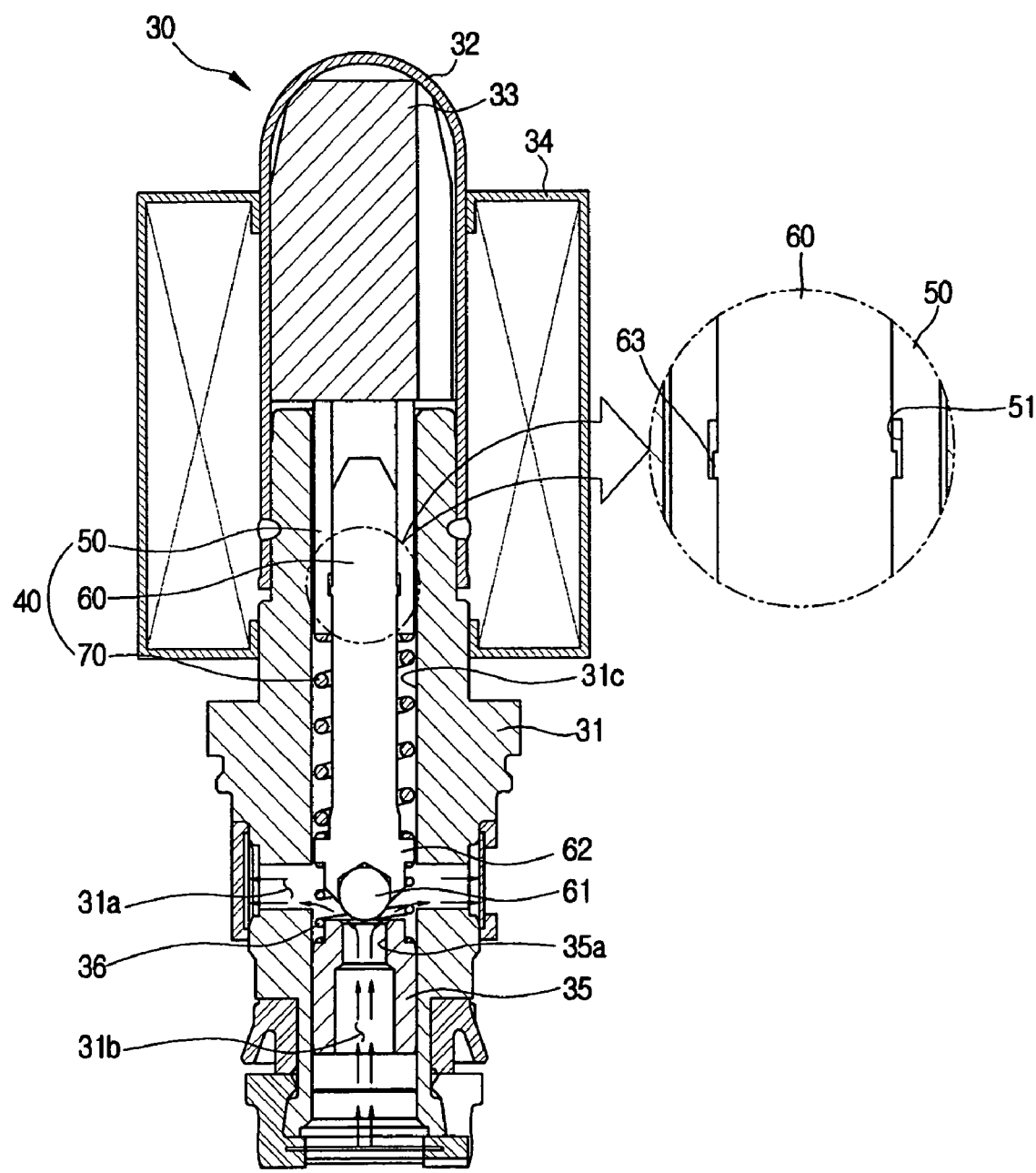
FIG. 5 is a sectional view showing an operation of the brake traction control valve of the present invention with an oil passage of the brake traction control valve being opened.

As shown in FIG. 5, when power is not applied to the exciting coil 34, the plunger 40 and the armature 33 are kept moved toward the shell 32 by an elastic force of the return spring 36, so that the orifice 35a of the valve seat 35 is spaced apart from the closing member 61. Accordingly, at this time, the passage of the traction control valve 30 is opened so that brake oil flowing into the inlet 31a of the traction control valve 30 from the master cylinder 20 flows towards the NO valve 22 through an outlet 31b of the traction control valve 30.

Figure 6:
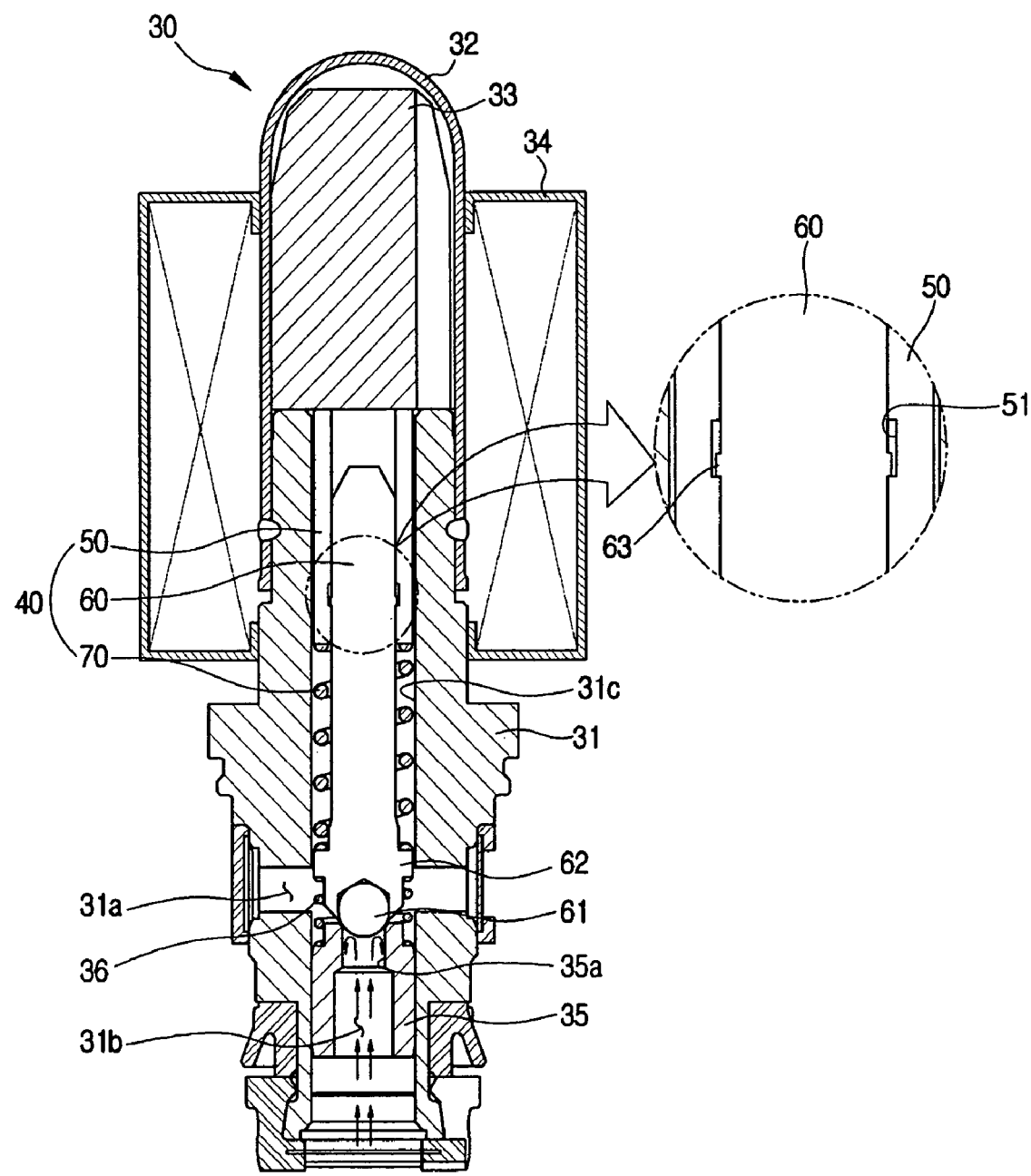
FIG. 6 is a sectional view showing an operation of the brake traction control valve of the present invention with the oil passage of the brake traction control valve being closed.

In contrast, when power is applied to the exciting coil 34, the plunger 40 is pushed toward the valve seat 35 by movement of the armature 33 toward the valve core 31, as shown in FIG. 6, so that the closing member 61 fitted into the lower end of the plunger 40 closes the orifice 35a of the valve seat 35. Accordingly, at this time, brake oil pressurized by the hydraulic pump 24 does not flow toward the master cylinder 20 but flows toward the wheels of the automobile through the NO valve 22, so that braking of the wheels is realized even though the driver does not depress the brake pedal 28.

Figure 7:
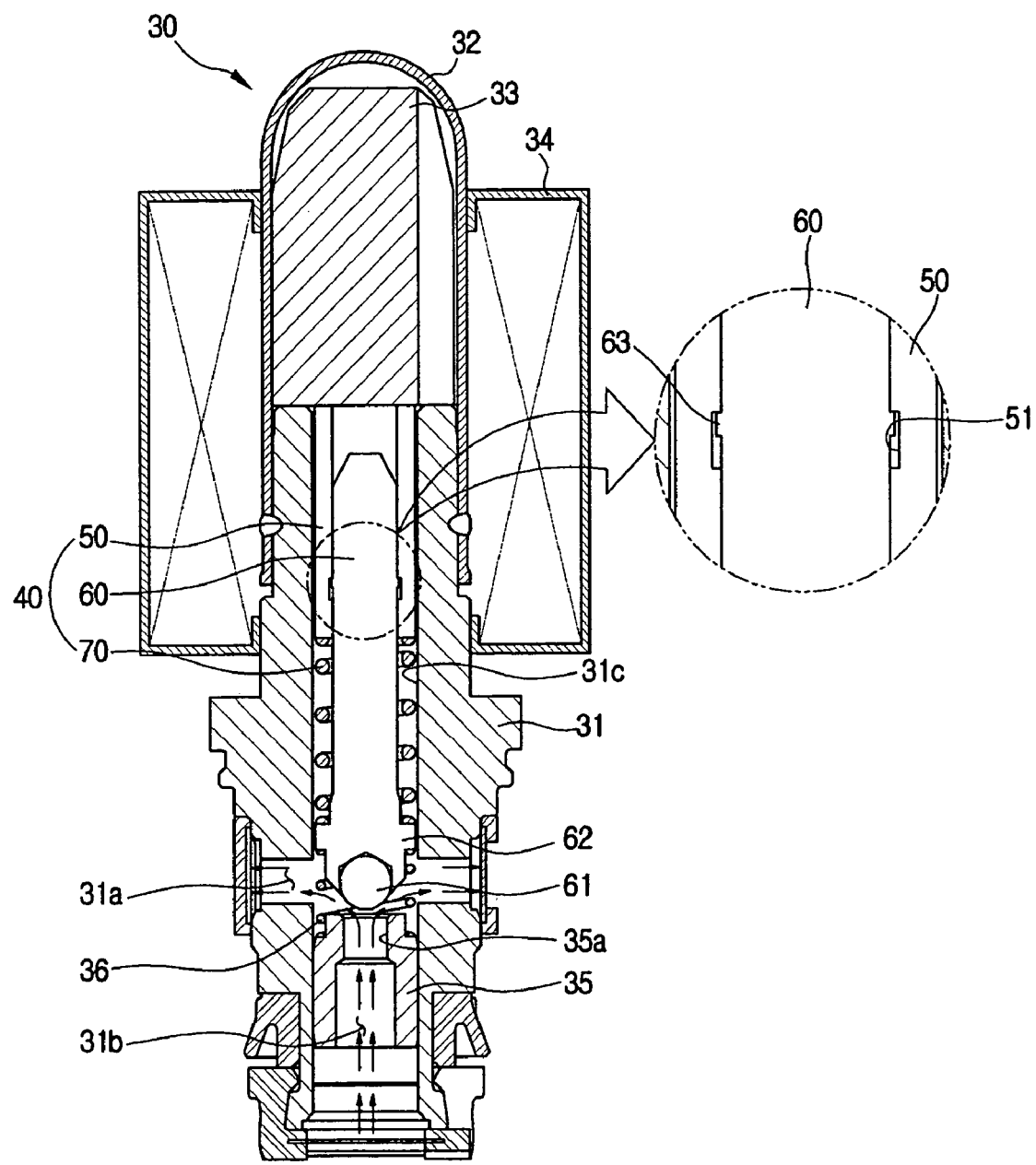
FIG. 7 is a sectional view showing an operation of the brake traction control valve of the present invention with the oil passage of the brake traction control valve being closed and a relief function of the brake traction control valve being performed.

When braking pressure applied to the wheel cylinders 21 by the operation of the hydraulic pump 24 increases above the predetermined value while the closing of the traction control valve 30 continues, the relief spring 70 is pushed by oil pressured formed on the outlet side of the orifice 35a and the closing member 61 is spaced apart from the orifice 35a, as shown in FIG. 7, so that the orifice 35a is opened and brake oil flows toward the master cylinder 20.

That is, at that time, since oil pressure formed on the outlet side of the orifice 35a is greater than the elastic force of the relief spring 70, the relief spring 70 is pushed and, simultaneously, the upper end of the second body 60 constituting a lower portion of the plunger 40 is moved into the inside of the first body 50 constituting an upper portion of the plunger 40, so that the closing member 61 fitted into the lower end of the first body 60 opens the orifice 35a and, therefore, brake oil flows toward the master cylinder 20, thus decreasing oil pressure formed on the outlet side of the hydraulic pump 24 to an appropriate level.

At this time, the armature 33 continues to push the plunger 40. Accordingly, when oil pressure formed on the outlet side of the hydraulic pump 24 decreases below the predetermined pressure through the above-described operation, the second body 60 is moved toward the valve seat 35 by a restoring force of the relief spring 70, so that the dosing member 61 closes the orifice 35a. With repetition of the above-described operations, oil pressure formed the outlet side of the hydraulic pump 24 is maintained in an appropriate level.

As described in detail above, in the brake traction control valve 30 according to the present invention, when the oil pressure formed on the outlet side of the hydraulic pump 24 is higher than the predetermined pressure, the second body 60 of the plunger 40 moves into the inside of the first body 50 while pushing the relief spring 70 by the oil pressure, so that the dosing member 61 opens an oil passage and, thus, brake oil located on the outlet side of the hydraulic pump 24 can flow toward the master cylinder 20. As a result, braking pressure formed on the outlet side of the hydraulic pump 24 can be appropriately adjusted without using an additional bypass hydraulic line and a relief valve, and a construction of a brake system is simplified, thus reducing a volume of the brake system.

Although a preferred embodiment of the present invention has been shown and described, it would be appreciated by those skilled in the art that changes may be made in these embodiments without departing from the principles and spirit of the invention, the scope of which is defined in the claims and their equivalents.

What is claimed is:

1. A brake traction control valve, comprising:
    a valve core having an inlet to allow inside and outside of the valve core to communicate with each other, and a valve seat provided with an orifice therein;
    a shell having a dome plus cylinder shape, the shell being coupled to the valve core to cover one end of the valve core;
    an armature placed in the shell to move forward or backward;
    an exciting coil placed around the shell to cause the armature to move forward or backward;
    a plunger placed in the valve core to move forward or backward to open or close the orifice of the valve seat while moving forward or backward by an operation of the armature, the plunger consisting of:
    a first body brought into contact with the armature and provided with a stopper groove on the inside surface thereof;
    a second body connected to a lower end of the first body to move forward or backward so as to open or close the orifice of the valve seat, the second body having:
        an upper part provided for being at least partly inserted in the lower end of the first body and having a stopper protrusion provided for cooperating with the stopper groove; and
        a lower part having a spring support; and
    a relief spring arranged outside of the first body around a portion of the upper part of the second body, between the lower end of the first body and the spring support of the lower part of the second body, so that the second body is pushed by oil pressure when the oil pressure increases above a predetermined pressure, thereby opening the orifice, and
    a return spring to return the plunger and the armature to open the orifice of the valve seat.

2. The brake traction control valve as set forth in claim 1, wherein the stopper protrusion is constructed to slide within the stopper groove in a direction in which the second body moves forward or backward; and
    a width of the stopper protrusion is formed to be narrower than that of the stopper groove so that the upper end of the second body can move forward or backward within the lower end of the first body in a state in which the first and second bodies are combined with each other.

3. The brake traction control valve as set forth in claim 2, wherein a width of the stopper groove within which the stopper protrusion is able to slide is longer than a moving distance of the second body moving forward or backward within the first body so that movement of the second body within the first body is not hindered by the stopper groove and the stopper protrusion.

4. The brake traction control valve as set forth in claim 1, wherein the second body is provided with a ball-shaped closing member at an end thereof opposite to the first body, the closing member opening or closing the orifice of the valve seat.

5. The brake traction control valve as set forth in claim 4, wherein the closing member is integrated with the second body.

6. The brake traction control valve as set forth in claim 1, wherein the relief spring has an elastic force greater than that of the return spring.

7. A brake traction control valve including a valve core which have an inlet to allow inside and outside of the valve core to communicate with each other, and a valve seat provided with an orifice therein, and further including a shell, an armature placed in the shell and a plunger placed in the valve core to move forward or backward to open or close the orifice, the brake traction control valve comprising:

a first body brought into contact with the armature and provided with a stopper groove on the inside surface thereof;

a second body connected to one end of the first body to move forward or backward so as to open or close the orifice of the valve seat and provided with a stopper protrusion and a spring support on the outside surface thereof; and a relief spring provided outside of the first body and between the first and second bodies so that the second body is pushed by oil pressure when the oil pressure increases above a predetermined pressure, thereby opening the orifice.

8. A brake traction control valve, comprising:

a valve core having an inlet to allow inside and outside of the valve core to communicate with each other, and a valve seat provided with an orifice therein;

a shell having a dome plus cylinder shape, the shell being coupled to the valve core to cover one end of the valve core;

an armature placed in the shell to move forward or backward;

an exciting coil placed around the shell to cause the armature to move forward or backward;

a plunger placed in the valve core to move forward or backward to open or close the orifice of the valve seat while moving forward or backward by an operation of the armature; and a return spring to return the plunger and the armature to open the orifice of the valve seat;

wherein the plunger comprises a first body brought into contact with the armature, a second body connected to one end of the first body to move forward or backward so as to open or close the orifice of the valve seat, and a relief spring provided outside the first body and between the first and second bodies so that the second body is pushed by oil pressure when the oil pressure increases above a predetermined pressure, thereby opening the orifice.

* * * * *